United States Patent
Budmiger et al.

(10) Patent No.: US 8,819,656 B2
(45) Date of Patent: Aug. 26, 2014

(54) METHOD FOR START-UP AND/OR RECONFIGURATION OF A PROGRAMMABLE FIELD-DEVICE

(75) Inventors: Thomas Budmiger, Ettingen (CH); Michael Kirst, Lörrach (DE); Wolfgang Drahm, Freising (DE); Simon Stingelin, Fehren (CH)

(73) Assignee: Endress + Hauser (Deutschland) AG + Co. KG, Weil, Rhein (DE)

( * ) Notice: Subject to any disclaimer, the term of this patent is extended or adjusted under 35 U.S.C. 154(b) by 1116 days.

(21) Appl. No.: 12/149,310

(22) Filed: Apr. 30, 2008

(65) Prior Publication Data

US 2008/0288933 A1 Nov. 20, 2008

Related U.S. Application Data

(60) Provisional application No. 60/924,435, filed on May 15, 2007.

(30) Foreign Application Priority Data

May 3, 2007 (DE) .......................... 10 2007 021 099

(51) Int. Cl.
G06F 9/44 (2006.01)

(52) U.S. Cl.
USPC .......................................................... 717/168

(58) Field of Classification Search
USPC .......................................................... 717/168
See application file for complete search history.

(56) References Cited

U.S. PATENT DOCUMENTS

| | | | |
|---|---|---|---|
| 5,343,761 A | 9/1994 | Myers | |
| 7,124,239 B2 * | 10/2006 | Saito et al. | 711/103 |
| 2001/0045134 A1 | 11/2001 | Henry et al. | |
| 2003/0041135 A1 * | 2/2003 | Keyes et al. | 709/223 |
| 2003/0236643 A1 | 12/2003 | Shajii et al. | |
| 2004/0044553 A1 * | 3/2004 | Lambert et al. | 705/7 |

FOREIGN PATENT DOCUMENTS

| | | |
|---|---|---|
| WO | WO 01/14968 | 3/2001 |
| WO | WO 03/017149 | 2/2003 |
| WO | WO 04/001516 | 12/2003 |

* cited by examiner

*Primary Examiner* — Don Wong
*Assistant Examiner* — Deric Ortiz
(74) *Attorney, Agent, or Firm* — Bacon & Thomas, PLLC

(57) ABSTRACT

An installed hardware of a measuring field device includes at least one transducer reacting during operation to a chemical and/or physical, measured variable of a pourable and/or flowable medium, especially a pourable or flowable bulk good, liquid, gas or the like, as well as a microcomputer communicating during operation with the transducer. The field device is first installed by means of the transducer on, and/or in a process vessel serving for conveying and/or holding pourable and/or flowable media for forming a process measuring point. Thereafter, the microcomputer is booted and a basic software held in a memory provided within the field device for providing, at least in part, basic functionalities of the field device is activated in such a manner that the basic software is executable by means of the microcomputer so that, in the interaction of basic software and hardware installed in the field device, the basic functionalities of the field device are available. Additionally, at least one initial identification parameter set held at least temporarily in the field device and at least approximately identifying the process measuring point is transferred, with application of basic software executed in the microcomputer, to a data processing system superordinated externally of the field device, and at least one upgrade software providing custom functionalities for the field measuring device going beyond the basic functionalities and held in a second memory, is selected from an ensemble of software products, taking into consideration the at least one, initial identification parameter set. A selected upgrade software fitted to the process measuring point is then transferred into a third memory provided within the field measuring device and then activated in such a manner that it is executable by means of the microcomputer, so that, in interaction of upgrade software and hardware installed in the field device, custom functionalities of the field measuring device are available.

54 Claims, 2 Drawing Sheets ered in, a containment,Goubau lines or vibrating immersion elements.

METHOD FOR START-UP AND/OR RECONFIGURATION OF A PROGRAMMABLE FIELD-DEVICE

TECHNICAL FIELD

The invention relates to a method for start-up and/or reconfiguration of a programmable, measuring field-device whose installed hardware includes: At least one measuring transducer reacting during operation to a chemical and/or physical, measured variable of a pourable and/or flowable medium, especially a pourable and/or flowable bulk good, a liquid, a gas or the like; and a microcomputer, which is in communication with the transducer during operation.

BACKGROUND DISCUSSION

In industrial process measurements technology, especially also in connection with the automation of chemical or other engineered processes and/or the automatic control of industrial plants, measuring devices installed near to the process, so-called measuring field-devices are used, which serve for producing analog or digital, measurement values representing chemical and/or physical, process measured variables and for making available measurement value signals ultimately carrying these measurement values, for example in the form of data telegrams. The process variables to be registered can include, for example, a mass or volume flow, e.g. flow rate, a density, a viscosity, a fill or limit level, a pressure or a temperature, or the like, of a liquid, powdered, vaporous or gaseous medium, which is conveyed, or stored, in a containment, such as e.g. a pipeline or a tank.

For registering such process variables, field devices of the described kind include appropriate physical-to-electrical, or chemical-to-electrical, measuring transducers, as well as a measuring device electronics connected to the measuring transducer.

The transducer is most often installed in a wall of the containment, or in the course of a line, e.g. a pipeline, conveying the medium, and serves for producing an electrical measurement signal appropriately corresponding to the process variable to be registered.

For processing the measurement signal, the transducer is connected with an operating and evaluating circuit provided in the measuring device electronics for the further processing or evaluating of the at least one measurement signal as well as for the generation of corresponding measurement value signals. In a large number of field devices of the described kind, the measuring transducer for producing the measurement signal is additionally so activated by a driver signal generated at least at times during operation by an operating circuit provided in the measuring device electronics, that it acts on the medium in a manner suited for the measurement at least mediately or, however, also via a probe directly contacting the medium, in order to provoke reactions there appropriately corresponding with the measured variable to be registered. The driver signal can, in such case, be appropriately controlled, for example with respect to an electrical current, or voltage, level and/or a frequency. Examples of such active transducers, thus transducers appropriately converting an electrical driver signal in the medium, include, especially, flow measuring transducers serving for measuring, at least at times, flowing media, e.g. transducers with at least one coil activated by a driver signal and producing a magnetic field, or at least one ultrasonic transmitter activated by a driver signal, or, however, also fill level and/or limit level transducers serving for measuring and/or monitoring fill levels in a container, such as e.g. those with freely radiating, microwave antennas, Goubau lines or vibrating immersion elements.

For accommodating the measuring device electronics, measuring field-devices include, further, a relatively robust, especially shock, pressure and/or weather resistant, electronics housing. This can, as proposed e.g. in U.S. Pat. No. 6,397, 683 or WO-A 00/36379, be arranged remotely from the field device and be connected therewith only via a flexible cable; it can, however, also, as shown e.g. in EP_A 903 651 or EP-A 1 008 836, be arranged directly on the measuring transducer or on a transducer housing separately housing the transducer. Often, the electronics housing serves, as shown, for example in EP-A 984 248, U.S. Pat. No. 4,594,584, U.S. Pat. No. 4,716,770 or U.S. Pat. No. 6,352,000, also for accommodating some mechanical and/or electromechanical components of the transducer, such as e.g. membrane, rod, sleeve or tubular, deformation or vibration elements deforming during operation due to mechanical effects; compare, in this regard, also the above-mentioned U.S. Pat. No. 6,352,000.

With measuring devices of the aforementioned kind, the measuring device electronics is usually electrically connected, via corresponding electrical lines and/or wirelessly via radio, with a superordinated electronic data processing system most often spatially removed from the measuring device and most often also spatially distributed. To such data processing system, the measurement values produced by means of the measuring device are forwarded, near in time, by means of a measurement value signal bearing them.

Measuring devices of the described kind are, additionally, usually connected with one another and/or with corresponding electronic process controls by means of a wire- or radio-based, data transmission network provided within the superordinated data processing system. The electronic process controls can include programmable logic controllers installed on-site and process control computers installed in a remote control room. To these, the measurement values produced by means of the measuring field device are forwarded, digitized in suitable manner and appropriately coded. By means of the process control computers, the transmitted measurement values can, using correspondingly installed software components, be further processed and visualized as measurement results e.g. on monitors and/or transformed into control signals for other field devices embodied as control elements, such as magnetic valves, electric motors, etc. Accordingly, the data processing system also usually serves for conditioning the measurement value signal delivered from the measuring device according to the requirements of downstream data transmission networks, for example for suitably converting such to digital form and, as required, for conversion into a corresponding telegram, and/or the data processing system may serve for on-site evaluation. For such purpose, provided in such data processing systems, electrically coupled with the relevant connecting lines, are evaluation circuits, which pre- and/or further-process, as well as, if required, suitably convert, the measurement values received from the pertinent measuring device. Serving for data transmission in such industrial data processing systems are, at least sectionally, fieldbusses, especially serial fieldbusses, such as FOUNDATION FIELDBUS, CAN, CAN-OPEN RACKBUS-RS 485, PROFIBUS, etc. or, for example, also networks based on the ETHERNET standard, as well as the corresponding, most often application-spanning, standard transmission protocols.

Usually also implementable by means of a control computer are, besides the mentioned process-visualizing, -monitoring and -control, also remote servicing, parametering and/or monitoring of the attached field, measuring devices. Accordingly, modern field devices permit, besides the actual measurement value transmission, also transmission of various setting and/or operating parameters used in the field device, such as e.g. calibration data, measurement value ranges, or also diagnosis information internally generated in the field devices. In line with this, it is possible most often likewise to send operating data, selected for the field device, to the field device via the aforementioned data transmission networks, which are most often hybrid as regards transmission physics and/or transmission logic.

Besides the evaluating circuits required for the processing and converting of the measurement values delivered by the connected measuring devices, superordinated data processing systems of the described kind have most often also electrical supply circuits serving for supply of the connected field devices with electrical energy, or power. Such supply circuits provide an appropriate supply voltage, which can, in appropriate circumstances, be fed directly from the connected fieldbus, for the relevant measuring device electronics and which drives the electrical lines connected thereto, as well as the electrical currents flowing through the associated measuring device electronics. A supply circuit can, in such case, be assigned to exactly one field device and be accommodated together with the evaluating circuit assigned to the particular measuring device, for example combined to a corresponding fieldbus adapter, in a shared housing embodied e.g. as a hat-rail module. It is, however, also quite usual, to accommodate such superordinated evaluating circuits and supply circuits each in separate, even spatially separated housings and to wire them appropriately together over external cables.

Examples with further details for such measuring field-devices known per se to those skilled in the art or also such measuring arrangements such as are formed by interplay of field device and data processing system are described in, among others, WO-A 06/111573, WO-A 06/002910, WO-A 03/048874, WO-A 03/098154, WO-A 03/017149, WO-A 02/44661, WO-A 02/45045, WO-A 02/103327, WO-A 02/086426, WO-A 01/02816, WO-A 01/14968, WO-A 00/77585, WO-A 00/77583, WO-A 00/48157, WO-A 00/36379, WO-A 00/14485, WO-A 95/16897, WO-A 88/02853, WO-A 88/02476, U.S. Pat. No. 7,134,348, U.S. Pat. No. 7,133,727, U.S. Pat. No. 7,124,239, U.S. Pat. No. 7,075,313, U.S. Pat. No. 7,073,396, U.S. Pat. No. 7,040,181, U.S. Pat. No. 7,032,045, U.S. Pat. No. 6,889,150, U.S. Pat. No. 6,854,055, U.S. Pat. No. 6,799,476, U.S. Pat. No. 6,776,053, U.S. Pat. No. 6,769,301, U.S. Pat. No. 6,763,729, U.S. Pat. No. 6,633,826, U.S. Pat. No. 6,601,005, U.S. Pat. No. 6,577,989, U.S. Pat. No. 6,662,120, U.S. Pat. No. 6,640,308, U.S. Pat. No. 6,634,238, U.S. Pat. No. 6,601,005, U.S. Pat. No. 6,574,515, U.S. Pat. No. 6,564,612, U.S. Pat. No. 6,535,161, U.S. Pat. No. 6,512,358, U.S. Pat. No. 6,505,519, U.S. Pat. No. 6,487,507, U.S. Pat. No. 6,480,131, U.S. Pat. No. 6,476,522, U.S. Pat. No. 6,397,683, U.S. Pat. No. 6,352,000, U.S. Pat. No. 6,311,136, U.S. Pat. No. 6,285,094, U.S. Pat. No. 6,269,701, U.S. Pat. No. 6,236,322, U.S. Pat. No. 6,140,940, U.S. Pat. No. 6,014,100, U.S. Pat. No. 6,006,609, U.S. Pat. No. 5,959,372, U.S. Pat. No. 5,796,011, U.S. Pat. No. 5,742,225, U.S. Pat. No. 5,742,225, U.S. Pat. No. 5,706,007, U.S. Pat. No. 5,687,100, U.S. Pat. No. 5,672,975, U.S. Pat. No. 5,604,685, U.S. Pat. No. 5,535,243, U.S. Pat. No. 5,469,748, U.S. Pat. No. 5,416,723, U.S. Pat. No. 5,363,341, U.S. Pat. No. 5,359,881, U.S. Pat. No. 5,231,884, U.S. Pat. No. 5,207,101, U.S. Pat. No. 5,131,279, U.S. Pat. No. 5,068,592, U.S. Pat. No. 5,065,152, U.S. Pat. No. 5,052,230, U.S. Pat. No. 4,926,340, U.S. Pat. No. 4,850,213, U.S. Pat. No. 4,768,384, U.S. Pat. No. 4,716,770, U.S. Pat. No. 4,656,353, U.S. Pat. No. 4,617,607, U.S. Pat. No. 4,594,584, U.S. Pat. No. 4,574,328, U.S. Pat. No. 4,524,610, U.S. Pat. No. 4,468,971, U.S. Pat. No. 4,317,116, U.S. Pat. No. 4,308,754, U.S. Pat. No. 3,878,725, US-A 2006/0179956, US-A 2006/0161359, US-A 2006/0112774, US-A 2006/0096390, US-A 2006/0081067, US-A 2005/0139015, US-A 2004/0117675, EP-A 1 158 289, EP-A 1 147 463, EP-A 1 058 093, EP-A 984 248, EP-A 591 926, EP-A 525 920, DE-A 103 25 277, DE-A 44 12 388 or DE-A 39 34 007.

In modern measuring field devices, the operating and evaluating circuit is usually formed by means of a re-programmable microcomputer, as well as program code correspondingly executed therewith. The program code is at least partially provided by means of software. The software is usually, at least in part, embodied as hardware-near software, conventionally also referred to as firmware, and is, before start-up of the field device, persistently programmed into non-volatile memories, e.g. a PROM or an EPROM, of the microcomputer, in order to be able to be loaded, as required for the operation of the field device, into a volatile data memory, e.g. a RAM, serving as working memory. "Persistent" means in this case that the software, on the one hand, remains stored following loss of power and so remains executable following re-start of the microcomputer, and that, on the other hand, the software stored within the measuring device can be re-programmed in part, or also can be completely overwritten. During start-up, the microcomputer is most often brought so far into operation, using permanently programmed firmware, the so-called bootstrap loader, implementing the booting, that at least communication of the field device with the superordinated data processing system and activation of further software components required for the actual measurement operation are enabled.

As a result of application of ever more powerful micro- and/or signal-processors for such programmable microcomputers, the functionalities implemented in the field device, especially also measurement signal processing, as well as also the ascertaining of the measurement values based thereon, or their visualization on-site, can, on the one hand, be embodied very complexly, while, on the other hand, however, they can also be customized to be application specific to high degree, especially also branch- and/or customer-specific; this customizing can, on occasion, also be accomplished first on-site, after installation of the field device and its start-up. Associated with the growth in power of the microcomputers, modern field devices additionally permit, beyond the actual measurement value generation as primary function of field devices, implementation to an increasing degree of functionalities which yet more support an efficient and safe conducting of the process being followed. Such secondary functionalities can include, for example, the storing of measurement and/or operational data in history memories, the ascertainment of complex measured variables using interaction with other field devices, control (both open-loop and closed-loop) functions using interaction with process control elements, such as perhaps valves or pumps, internal or external monitoring, validation and/or diagnosis functions, internal functions being such as concern the field device itself, and external functions being those directed at the monitored industrial process installation. Further, such additional functionalities can relate e.g. also to the start-up of the field device as well as its being tied into the data transmission system. Due to this expanded functionality of modern measuring field devices, to an increasing degree, process control functions can be shifted into the field, so that the process control system can be correspondingly organized decentrally. Examples of such re-programmable and thus re-configurable field devices, whose functionalities are application-specifically adaptable also after installation and start-up, especially also during operation, are shown in, among others, the already mentioned U.S. Pat. No. 7,124,239, U.S. Pat. No. 6,633,826, U.S. Pat. No. 6,854,055, WO-A 01/14968, WO-A 00/77585, WO-A 00/77583, WO-A 00/48157, WO-A 03/098154 or WO-A 06/111573.

The growth of functionality shifted into the field device means, on the one hand, also an increasing individualizing of field devices of the described kind, and, on the other hand, for the manufacturer, besides an increased developmental and manufacturing complexity, especially also a significant logistical complexity. Equally, however, also the selection of the right functionalities represents for the user a great effort as regards specifying the requirements for the field device to be installed, this both because of the scarcely any longer manageable multiplicity of the currently or also future offered, basic- and special-functionalities, as well as also due to the high variability in the process-plants and/or -flows to be monitored by the particular field device, for example as a result of operationally varying media or varying media types, especially as regards their flow indices and their compositions. As a result, manufacturers of such field devices are increasingly beginning to offer programs supporting planning. With the help of these programs, parameters relevant for the process measuring point formed by means of the field device can be ascertained very comfortably in advance, perhaps also via Internet dialog with a host computer installed manufacturer-side. Based thereon, it is also possible directly to initiate an ordering of such a field device optimized with respect to the actual application. Examples of such planning and ordering programs, possibly also communicating via Internet, are described in, among others, U.S. Pat. No. 6,889,150, US-A 2007/0067512, US-A 2006/0173836 or WO-A 02/44661.

A disadvantage of such planning and ordering programs is, however, to be seen in that, on the one hand, for optimizing the field device, especially for the matching of its functionalities to be implemented by means of the microcomputer, a considerable, sometimes unacceptably high number of parameters specifying the application need to be asked for, while, on the other hand, many of the parameters specifying the actual measuring point may not even yet be available at the time of ordering, be such due to the fact that that part of the plant does not yet exist and/or due to information still being absent as regards the interactions between process plant and the field device to be ordered. Furthermore, it is to be assumed that, as a result of further developments within the process plant as well as also as a result of improvement of the algorithms generating the measurement value, repeatedly a reconfiguring of the installed hardware will be necessary for field devices of the type being discussed and will involve introduction of new e.g. individual setting parameters, individual calculating routines, comprehensive operating and processing programs or software providing communication routines.

SUMMARY OF THE INVENTION

An object of the invention is, therefore to simplify start-up and/or reconfiguration of measuring field-devices of the described kind to the effect that therewith, even in cases where, a priori, little information concerning the actual measuring point is present, especially also information concerning the interactions between the field device and the medium, and with relatively little effort on the part of the user, a field device matched as optimally as possible to the particular process to be monitored, especially as regards also the particular medium and/or the particular installation situation, and, as required, also future extensions, can be provided.

For achieving such object, the invention resides in a method for start-up and/or reconfiguration of a programmable, measuring, field-device, whose installed hardware includes at least one measuring transducer reacting during operation to a chemical and/or physical, measured variable of a pourable and/or flowable medium, especially a pourable and/or flowable bulk good, liquid, gas or the like, as well as a microcomputer communicating therewith during operation. The method of the invention includes, for example, the following steps:

Installing the field device by means of the transducer on at and/or in a process vessel, especially a process vessel in the form of a pipeline, a gutter, a tank, a basin or the like, for conveying and/or holding pourable and/or flowable media, especially pourable and/or flowable bulk goods, liquids, gases or the like, for forming a process measuring point;

booting the microcomputer and activating basic software, especially an at least partially hardware-near software, held in a first memory, especially a non-volatile first memory, provided within the field device and at least partially providing basic functionalities of the field device, in such a manner, that the basic software is executable by means of the microcomputer, so that the basic functionalities of the field device are available on the basis of interaction of basic software and hardware installed in the field device;

transferring to a superordinated, electronic data processing system external to the field device, especially one remote and/or spatially distributed with respect thereto, at least one initial identification parameter set, especially an initial identification parameter set determined by application of basic software executed in the microcomputer, wherein the at least one initial identification parameter set at least approximately identifies, especially also specifies, the process measuring point, especially also an instantaneous installation situation of the field device and/or a medium located in the process vessel, and wherein the initial identification parameter set is held at least temporarily in the field device;

selecting from an ensemble of software products, especially fixedly preprogrammed software products or, instead, revisable software products, taking into consideration the at least one, initial identification parameter set, especially an initial identification parameter set already embodied as an order code for software, at least one upgrade software providing custom functionalities for the field device going beyond the basic functionalities, especially an upgrade software providing field device specific and/or application specific, custom functionalities, wherein the upgrade software is held in a second memory, especially a second memory located externally of the field device and remote from same and/or a second memory located internally of the data processing system;

transferring selected upgrade software, matched to the process measuring point, especially the installation situation of the field device and/or the medium present in the process vessel, into a third memory, especially a non-volatile, third memory, provided within the field device; and activating upgrade software, especially persistently and/or permanently stored upgrade software, in such a manner that at least the transferred upgrade software, especially transferred upgrade software which is at least partially hardware-near, is executable by means of the microcomputer, so that, with interaction of the upgrade software and hardware installed in the field device, custom functionalities of the field device are available.

In a first embodiment of the method of the invention, it is provided that the second memory, especially a non-volatile memory, containing the upgrade software is arranged externally of the field device, especially remotely therefrom, and/or internally of the data processing system.

In a second embodiment of the method of the invention, such further includes a step of linking the field device to the superordinated, electronic, data processing system in such a manner that data can be communicated, especially by wire and/or wirelessly by radio, between field device and data processing system.

In a third embodiment of the method of the invention, such further includes a step of providing a communications connection between the field device and the data processing system for transmission, especially by wire or wirelessly, of the at least one initial identification parameter set and/or the upgrade software. In an advantageous further development of this embodiment, it is provided that the communications connection is formed, at least sectionally, by means of a digital data line, especially a two-wire line also providing the field device with power, and/or at least sectionally, by means of a radio connection.

In a fourth embodiment of the method of the invention, it is provided that the second memory containing the upgrade software is installed in a host computer provided in the data processing system, especially a host computer situated in a control room.

In a fifth embodiment of the method of the invention, it is provided that the second memory containing the upgrade software is formed by means of a hard-disk, a CD-ROM, a diskette, a DVD, a magnetic tape or some other form of mass storage.

In a sixth embodiment of the method of the invention, it is provided that the microcomputer is formed by means of at least one microprocessor and/or by means of a signal processor.

In a seventh embodiment of the method of the invention, it is provided that the microcomputer includes at least one volatile memory, especially one serving as working memory for a microprocessor and/or signal processor provided in the microcomputer.

In an eighth embodiment of the method of the invention, it is provided that the first memory provided in the field device for the basic software is embodied as non-volatile memory, especially a persistent non-volatile memory.

In a ninth embodiment of the method of the invention, it is provided that the third memory provided in the field device for custom software is embodied as volatile memory. In a further development of this embodiment of the invention, it is further provided that the step of activating the basic software includes a step of loading at least parts of the basic software into the volatile working memory and/or that the step of activating of the upgrade software includes a step of loading at least parts of the upgrade software into the volatile working memory.

In a tenth embodiment of the method of the invention, such further includes a step of inputting a start command, which initiates, at least mediately, especially near in time, the step of transferring the at least one initial identification parameter set to the data processing system, especially to a host computer provided therein.

In an eleventh embodiment of the method of the invention, such further includes a step of producing at least one measurement signal by means of the transducer.

In a twelfth embodiment of the method of the invention, such further includes a step of determining the initial identification parameter set by applying basic software executed in the microcomputer, especially also by taking into consideration the at least one measurement signal and/or an application parameter specified by a user in dialog with the field device by means of a human-machine interface, especially a human-machine interface provided directly on the field device. In an advantageous further development of this embodiment of the method, the initial identification parameter set is, in such case, determined in such a manner that it represents instantaneously, at least in part, an instantaneous installation situation of the installed field device, especially its installed length, its nearness to a disturber, such as a valve, a pump, a stirrer or the like, and/or medium located in the process vessel, especially the flow type of the medium, its composition, or the like.

In a thirteenth embodiment of the method of the invention, it is provided that the upgrade software delivers at least one data set of setting parameters to be changed for the field device, especially for a signal input stage conditioning a measurement signal produced by means of the transducer and/or for an evaluating algorithm executed by means of the microcomputer for numerically calculating the at least one measurement value and/or for a signal output stage delivering at least one driver signal for the transducer. In an advantageous further development of this embodiment of the method, the setting parameters to be changed have been generated at least in part by means of calibration measurements performed initially on said field device and/or on a field device of equal type.

In a fourteenth embodiment of the method of the invention, such further includes a step of determining at least one refined identification parameter set, which represents, by application of upgrade software and/or basic software executed in the microcomputer, the process measuring point formed by interaction of field device and process vessel instantaneously, especially more accurately than the initial identification parameter set, especially in terms of an instantaneous installation situation of the field device and/or a medium present in the process vessel. In an advantageous further development of this embodiment of the method, such further includes a step of transferring the at least one refined identification parameter set to the superordinated data processing system with application of upgrade software and/or basic software executed in the microcomputer. Taking into consideration the at least one transferred, refined identification parameter set, at least one upgrade software can be selected from a plurality of software products stored in the data processing system for providing custom functionalities for the field device going beyond the basic functionalities of the field device or supplementing or replacing custom functionalities currently available in the field device. This selected, especially also hardware-near, upgrade software can be transferred, for example, into the third memory provided within the field device and/or into a fourth memory, especially a non-volatile memory, provided within the field device.

In a fifteenth embodiment of the method of the invention, such further includes a step of determining at least one refined identification parameter set, which represents instantaneously, by application of upgrade software and/or basic software executed in the microcomputer, the process measuring point formed by interaction of field device and process vessel, especially more accurately than the initial identification parameter set, especially in terms of an instantaneous installation situation of the field device and/or a medium present in the process vessel, as well as a step of producing a start command, which initiates, at least mediately, especially near in time, the step of determining the at least one refined identification parameter set. In a further development of this embodiment of the method, it is additionally provided that such further includes a step of applying a human-machine interface communicating with the field device, especially electrically connected thereto and/or provided therein, for producing the start command, especially in dialog with the field device, and/or a step of producing a start command, which initiates, at least mediately, especially near in time and/or in real time, the step of transferring the at least one initial identification parameter set to the host computer. For producing the start command, especially in dialog with the field device, a human-machine interface communicating with the field device can be used, especially a human-machine interface electrically connected with the field device and/or provided therein.

In a sixteenth embodiment of the method of the invention, such further includes a step of determining at least one refined identification parameter set, which represents instantaneously, with application of upgrade software and/or basic software executed in the microcomputer, the process measuring point formed by interaction of field device and process vessel, especially more accurately than the initial identification parameter set, especially in terms of an instantaneous installation situation of the field device and/or a medium present in the process vessel, as well as a step of comparing the at least one refined identification parameter set with a predetermined device parameter representing, especially in the form of a device identification number or a version number, the hardware of the field device and/or the software momentarily executable in the field device. In a further development of this embodiment of the method, it is further provided that such further includes a step of generating a report, which signals, whether the identification parameter set and the device parameter agree, and/or a step of generating a report, which signals, whether the identification parameter set and the device parameter differ from one another.

In a seventeenth embodiment of the method of the invention, such further includes a step of producing at least one measurement signal by means of the transducer, as well as a step of determining at least one refined identification parameter set, which represents instantaneously, with application of upgrade software and/or basic software executed in the microcomputer, the process measuring point formed by interaction of field device and process vessel, especially more accurately than the initial identification parameter set, especially in terms of an instantaneous installation situation of the field device and/or a medium present in the process vessel. In a further development of this embodiment of the method, it is further provided that the refined identification parameter set is determined also taking into consideration the at least one measurement signal and/or the initial identification parameter set. The measurement signal can, in such case, also be used, for example, for producing a start command, which initiates, at least mediately, especially near in time, the step of determining the at least one refined identification parameter set and/or for producing a start command, which initiates, at least mediately, especially near in time, the step of transferring the at least one refined identification parameter set to the data processing system.

In an eighteenth embodiment of the method of the invention, such further includes a step of producing at least one measurement signal by means of the transducer, as well as a step of digitizing the at least one measurement signal for producing a digital measurement signal corresponding to the at least one measurement signal. In a further development of this embodiment of the invention, it is further provided that at least also the step of producing the initial identification parameter set further includes a step of applying the digital measurement signal. In another further development of this embodiment of the method, such further includes a step of producing at least one discrete signal sequence corresponding with sections of the measurement signal, especially a signal sequence stored in an internal memory of the field device. This can, in turn, be applied e.g. also for producing the identification parameter set. Additionally, it is provided that the basic functionalities of the field device include calculating routines for comparing discrete signal sequences corresponding with sections of the measurement signal with signal prototypes predetermined and correspondingly preclassified for different applications, especially for different installation situations and/or for different media. The production of the identification parameter set can then be done, for example, also by comparison of discrete signal sequences with one or more of such signal prototypes.

In a nineteenth embodiment of the method of the invention, such further includes a step of producing at least one measurement signal by means of the transducer, with the basic functionalities of the field device including calculating routines for spectral analysis at least of the measurement signal, especially based on a discrete Fourier transformation of the measurement signal and/or a discrete autocorrelation of the measurement signal. For producing the identification parameter set, additionally also a discrete amplitude spectrum of the measurement signal can be used, for example on the basis of at least one spectral amplitude value, especially one selected at a predetermined signal frequency and/or at a predetermined signal amplitude.

In a twentieth embodiment of the method of the invention, it is provided that the upgrade software provides setting parameters for installed hardware and/or calculating algorithms representing digital filters, especially adaptive digital filters.

In a twenty-first embodiment of the method of the invention, it is provided that the upgrade software provides an expanded diagnosis function going beyond a diagnosis function for determining at least the at least one initial identification parameter set, especially a diagnosis function within the basic functionalities.

In a twenty-second embodiment of the method of the invention, such further includes a step of producing at least one measurement signal by means of the transducer, as well as a step of determining at least one digital measured value, which represents the at least one measured variable, based on the at least one measurement signal and upgrade software executed in the microcomputer. In a further development of this embodiment of the method, such further includes a step of determining at least one digital measurement value, which represents instantaneously the at least one measured variable, based on the at least one measurement signal and basic software executed in the microcomputer. In another further development of this embodiment of the method, such further includes a step of determining at least a first digital measurement value, which represents instantaneously the at least one measured variable, based on the at least one measurement signal and basic software executed in the microcomputer, and a step of determining at least a second digital measurement value, which represents instantaneously the at least one measured variable, based on the at least one measurement signal and upgrade software executed in the microcomputer. Especially, it is provided, in such case, that the first digital measurement value and the second digital measurement value are of equal type, in that they represent the same measured variable, especially with the same unit of measurement.

In a twenty-third embodiment of the method of the invention, such further includes a step of producing at least one measurement signal by means of the transducer, a step of determining at least one digital measurement value, which represents instantaneously the at least one measured variable, based on the at least one measurement signal and upgrade software executed in the microcomputer, as well as a step of producing a communications connection between the field device and the superordinated electronic data processing system for transmission of the at least one digital measurement value, especially by wire and/or wirelessly. In a further development of this embodiment of the method, such further includes a step of transferring the measurement value to the electronic data processing system. Additionally, it is further provided that the communications connection is formed at least sectionally by means of a digital data line, especially a data line in the form of a two-wire line also supplying the field device with energy, or power, and/or at least sectionally by means of a radio connection.

In a twenty-fourth embodiment of the method of the invention, such further includes a step of storing, within the superimposed electronic data processing system, at least one identification parameter set produced by means of the field device and identifying, at least approximately, the process measuring point.

Method as claimed in the preceding claim, further including a step of adding at least one more upgrade software to the ensemble of software products and a step of applying the at least one identification parameter set stored in the data processing system for generating a report, especially a report addressed directly to the field device, signaling the addition of the at least one more upgrade software to the ensemble. In a further development of this embodiment of the method, it is provided that the step of generating the report is executed at least when the added upgrade software fits the process measuring point.

In a twenty-fifth embodiment of the method of the invention, it is provided that the field device further includes a transducer housing, in which the transducer is at least partially accommodated, as well as an electronics housing, in which at least the microcomputer is accommodated. In a further development of this embodiment of the method, it is further provided that the transducer housing and the electronics housing are connected with one another, especially essentially rigidly connected with one another.

A basic idea of the invention is to complete design of measuring field devices, and thus also the process measuring points formed in each case therewith, by transferring and activating an upgrade software providing application specific custom functionalities essentially immediately during start-up of the field device. In this way, the design phase for the process measuring point from the planning, through ordering, up to installation and start-up, including possible re-configurations of the installed field device, can, over-all, be shortened to a considerable degree; this especially also given knowledge of details on-site at the actual process measuring point. Additionally, design can be considerably simplified, on the one hand, in that actually required functionalities of the field device, especially also more complex, application-specific functionalities, for example evaluation and/or control functions acting beyond the measuring device, complex process and/or internal diagnosis functionalities, adaptive filters and/or their filter parameters, etc., can be individually determined, at least in part, first following installation, semiautomatically in dialog with the user effecting the start-up or even completely automatically, and, indeed, also while taking into consideration measurement and operating data totally specifying the particular process measuring point. On the other hand, it is possible, in this way, also to load not only special software optimally fitted to the concrete process measuring point, but, also, unforeseeably not-required software products need not be ordered. As a result of this, it is possible to operate a given field device with software providing quasi "custom-tailored" custom functionalities for the user, as required, also together with a correspondingly adapted, "custom-tailored" device documentation, thus being also optimized as regards scope and costs. Moreover, it is additionally also possible, as a result, to react quickly to changes at the process measuring point or in its immediate vicinity, in order that, on the one hand, a possible re-configuration requirement is itself detectable by means of the field device during operation and correspondingly required adapting of the stored software of the field device can be conducted as regards procurement and activation, in the same manner as was done earlier in the actual start-up, possibly also by means of a remote servicing and parametering. Equally, it is possible to refer back at a later point in time, for example in the course of a manufacturer-side initiated, software updating, to the identification parameter set transmitted earlier and, based thereon, a new, equally custom-tailored upgrade software can be made available to the user, as required, also by direct access to the field device via remote parametering.

BRIEF DESCRIPTION OF THE DRAWINGS

The invention and further advantageous embodiments thereof will now be explained in greater detail on the basis of the figures of the drawing. Functionally equal parts, when they appear in subsequent figures, are provided with the same reference characters, which are, however, only repeated, when such appears useful. The figures show as follows.

DETAILED DISCUSSION

Figure 1:
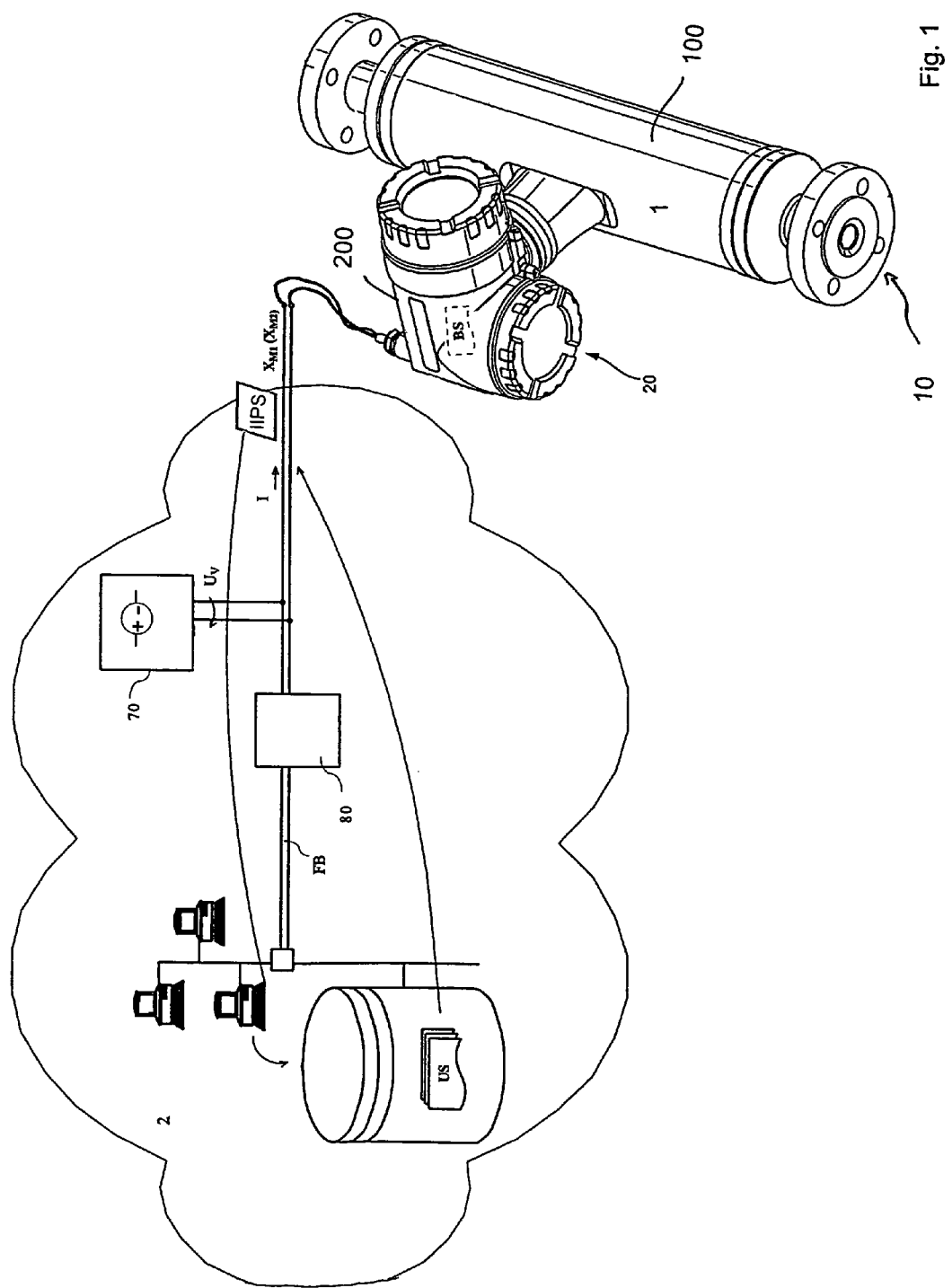
FIG. 1 a measuring arrangement formed by means of a measuring device and a superordinated, electronic data processing system.
Figure 2:
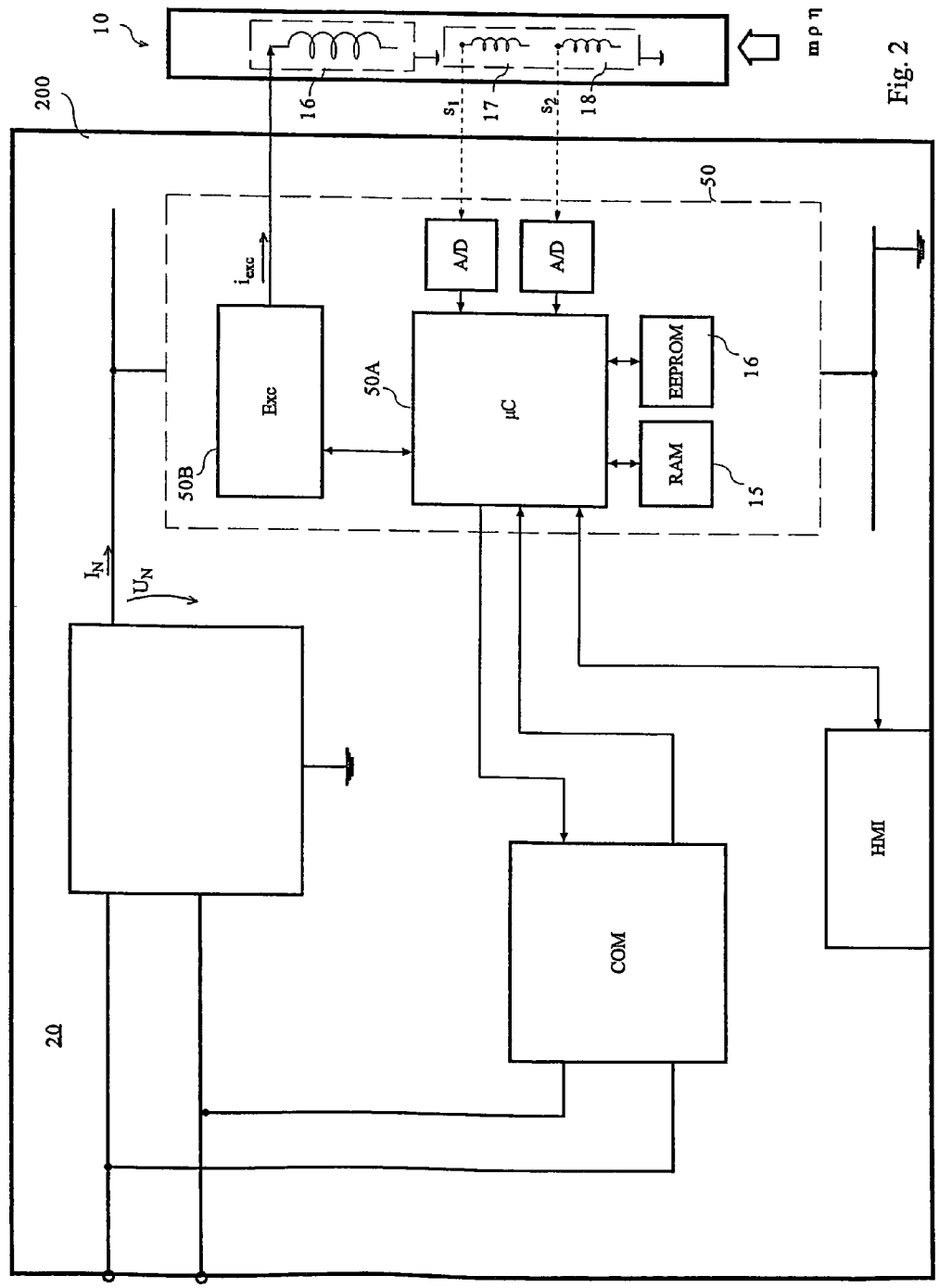
FIG. 2 a block diagram of a measuring device electronics suited for application in a measuring device of FIG. 1.

FIGS. 1 and 2 show an example of an embodiment of a measuring arrangement suited for application in industrial measurements and automation technology, including details thereof, as provided for registering and, as required, further processing by computer, chemical and/or physical, measured variables of a flowable and/or pourable medium, especially a pourable and/or flowable bulk good, liquid, gas or the like, conveyed or held in a process vessel (not shown), especially a process vessel in the form of a pipeline, a gutter, a tank, a basin or the like. The measuring arrangement includes, for such purpose, at least one programmable, measuring field-device 1, whose installed hardware includes, as shown schematically in FIG. 2: At least one measuring transducer 10 reacting primarily to, especially also to changes of, the at least one chemical and/or physical, measured variable to be registered for the medium to be measured; as well as a measuring electronics 20 communicating with the transducer 10 during operation and formed by means of at least one microcomputer. Transducer 10 of the measuring device is installed on, at and/or in the process vessel, as formed by a process container or a process line, in order to provide a process measuring point, and delivers during normal measuring operation at least one measurement signal $s_1$ influenced by the at least one measured variable to be registered and, as a result, corresponding therewith. The measurement signal is, for example, a variable signal voltage and/or a variable signal current, which the measuring electronics 20 by means of the microcomputer uses to generate, repeatedly during normal measurement operation, measurement values representing the measured variable to be measured.

Especially, field device 1 is provided in an embodiment of the invention for registering and/or monitoring, as well as repeatedly delivering measurement values representing, a measured variable, such as a mass flow m, a density ρ, a viscosity η, a volume flow, a flow velocity, a pressure p, a temperature ', a pH value, a level, or the like, of a medium, especially a medium such as a gas, a liquid, a powder or a mixture formed therefrom, conveyed or held in a process line, for example a pipeline, a gutter, or the like, and/or a process container, for example a tank, a basin, or the like.

In a further embodiment of the invention, the measuring transducer is so formed that it reacts to changes of a measured variable $X_{M1}$ of a first kind to be registered, for example a mass flow m of a medium flowing in a pipeline and at least one, different measured variable $X_{M2}$ of a second kind to be registered, for example a density ρ or a viscosity η of the same medium. Accordingly, the transducer is additionally so embodied that the at least one measurement signal $s_1$ delivered by the transducer also represents the measured variable of the second kind. Alternatively to, or in supplementation, the transducer can also be so embodied that it delivers at least a first measurement signal $s_1$ and a second measurement signal $s_2$. Associated therewith, the measuring device electronics can produce the measurement values at least partially on the basis of the first and second measurement signals $s_1$, $s_2$.

For further processing of the at least one measurement signal $s_1$ internally in the measuring device, the measuring device electronics 20 is additionally equipped with, as already mentioned, a microcomputer μC, which is formed by means of at least one microprocessor and/or by means of at least one signal processor. Alternatively to, or in supplementation, for realizing the microcomputer μC, also application-specific, integrated ASIC circuits and/or programmable, logic building blocks or systems can be used, such as e.g. so-called FPGAs (field programmable gate arrays) and/or, as proposed in, among others, also WO-A 03/098154, so-called SOPCs (system on programmable chip).

The at least one measurement signal $s_1$ produced by transducer 10 is fed through an input stage provided in the measuring device electronics 20 to the microcomputer μC. The input stage serves, in such case, essentially for digitizing the at least one measurement signal $s_1$ by means of signal filtering and analog-to-digital conversion and thus to convert such into at least one suitably conditioned, digital measurement signal for further processing internally in the measuring device. In appropriate circumstances, the input stage can additionally provide impedance conversion and/or preamplification for the at least one measurement signal.

The software required for operation of the microcomputer μC is stored, at least in part, in a non-volatile data memory circuit 15 of the measuring device electronics 20, for example persistently. The microcomputer has during operation at least data reading, and, as required, also data writing, access to the data memory circuit 15 via an internal bus system. Data memory circuit 15 can be implemented e.g. by means of a single EEPROM chip or by means of a plurality of modular EEPROM chips. Of course, also other non-volatile memory types known to those skilled in the art, such as e.g. flash-EEPROMs, EPROMs and/or CMOS circuits can be used for the data memory circuit 15. In case required, the data memory circuit 15 can be formed in part also by means of pre-programmed, permanent (thus not erasable and not capable of write-over) memory elements.

For implementing rapid, especially real time, signal processing routines, the microcomputer μC further includes volatile data memory circuit 16 of low access time, serving as working memory, into which frequently executing program code of the software can be loaded e.g. from the data memory circuit 16. Data memory 16 can be embodied e.g. as peripheral memory components coupled via internal bus system to the microprocessor or signal processor, and/or as cache memory directly integrated into the microcomputer. Serving as volatile data memory circuit 16 can be e.g. static and/or dynamic RAM circuits. In case required, data memory circuit 16 can additionally be used for buffering the digital measurement signal derived from the at least one measurement signal sectionally in the form of a sampling sequence of discrete measurement data corresponding with sections of the measurement signal.

Measuring device 1 includes, in an advantageous embodiment, additionally a transducer housing 100 at least partially housing the transducer 10. Additionally, measuring device 1 includes an electronics housing 200, especially an individual one, in which the measuring device electronics 20 connected electrically in suitable manner with the transducer 10 is accommodated, at least in part, especially entirely. Especially for the quite usual case in which the measuring device electronics is modularly constructed, for example with a transducer-near module preprocessing measurement signals and a module ascertaining measurement values, the electronics housing 200 can equally be modularly assembled. In a further advantageous embodiment of the invention, the transducer housing with the transducer located therein and the electronics housing 200 with the measuring device electronics located therein are mechanically, especially essentially rigidly, connected together to form a compact measuring device. In case required, the field measuring device can additionally include a display element, especially one suitably accommodated within the electronics housing 200 and yet visible to the outside for display of measurement values and, on occasion, also further measurement and operating data, or also alarm conditions, on-site.

In the case of the measuring device shown by way of example in FIGS. 1 and 2, such is an inline measuring device serving, especially, for registering measured variables, e.g. a mass flow, a density and/or a viscosity, of a medium, especially a gas and/or a liquid, in a pipeline (not shown), and for mapping such registration into measurement values $X_{M1}$ and/or $X_{M2}$ instantaneously representing these measured variables. Accordingly, the measuring device can be, for example, a Coriolis mass flow measuring device, a density measuring device or a viscosity measuring device. For producing the at least one measurement signal, the illustrated measuring device further includes a vibration-type measuring-transducer 10 accommodated within the transducer housing 100, which is essentially tubular in this case. Transducer 10 can be inserted into the course of a pipeline conveying the medium, so that medium flows through transducer 10 during operation. Construction and operation of such measuring transducers 10 of vibration-type are known to those skilled in the art and are also described in detail in the above-mentioned WO-A 02/103327, WO-A 02/086426, WO-A 88/02476, WO-A 00/36379, U.S. Pat. No. 7,134,348, U.S. Pat. No. 7,073,396, U.S. Pat. No. 6,769,301, U.S. Pat. No. 6,711,958, U.S. Pat. No. 6,691,583, U.S. Pat. No. 6,666,098, U.S. Pat. No. 6,006,609, U.S. Pat. No. 5,796,011, U.S. Pat. No. 5,687,100, U.S. Pat. No. 5,602,345, U.S. Pat. No. 5,359,881, U.S. Pat. No.

5,301,557, U.S. Pat. No. 5,231,884, U.S. Pat. No. 4,768,384, US-A 2006/0179956, US-A 2006/0161359, US-A 2006/0112774, US-A 2006/0096390 or US-A 2005/0139015. It is to be noted here that, although the measuring device, shown by way of example of an embodiment, is an inline measuring device equipped with a transducer of vibration-type, the invention can, of course, also be practiced with inline measuring devices having another type of transducer, for example those inline measuring devices with magneto-inductive transducers, thermal transducers, acoustic transducers, vortex transducers, etc. Equally, the present invention can, however, for example also be used in other types of measuring devices, for example such as serve for measuring measured variables in connection with containers storing media, thus e.g. those measuring and/or monitoring fill levels. Such measuring devices are usually implemented by means of transducers having at least one measuring probe protruding into a lumen of the container or a probe at least communicating with the lumen. Examples of these probes include microwave antennas, Goubau lines, vibrating immersion elements, or the like.

FIG. 2 is a block diagram of an embodiment of a measuring device electronics 20, especially one suited also for inline measuring devices of the aforementioned kind. To the right in FIG. 2, the measuring transducer is indicated, in this case in the form of a transducer of vibration-type, with at least one measuring tube 10, an exciter mechanism 16 acting thereon, especially an electrodynamic exciter mechanism 16, for causing the measuring tube to vibrate, and a sensor arrangement 17, 18, especially an electrodynamic sensor arrangement 17, 18, for registering vibrations of the at least one measuring tube and for producing the at least one measurement signal $s_1$, here representing vibrations of the at least one measuring tube. For producing the measurement values, there is provided in the measuring device electronics an operating and evaluating circuit 50, which appropriately drives the transducer through the intermediary of the exciter mechanism 16 and which receives the at least one measurement signal $s_1$, here generated via the sensor arrangement. The first measurement signal $s_1$ and the possibly present, second measurement signal $s_2$, of which each usually has a signal frequency corresponding to the instantaneous oscillation frequency of the measuring tube 13, are, as shown in FIG. 2, fed to an evaluation unit 50A of the operating and evaluating circuit 50 formed in the measuring device electronics 20 at least partly by means of the microcomputer μC. The evaluating unit 50A serves for ascertaining, especially numerically, the measurement value $X_{M1}$ of the first kind instantaneously representing e.g. the mass flow, etc. and for converting such into the appropriately corresponding measurement value signal $x_{M1}$ accessible at the output of the operating and evaluating circuit 50. Moreover, the evaluating unit 50A serves in an embodiment of the invention also for ascertaining, especially numerically, in addition to the measurement value $X_{M1}$ of the first kind, at least one measurement value $X_{M2}$ of the second kind, which represents instantaneously an additional measured variable to be registered, here e.g. the density and/or the viscosity of the medium. Equally, the evaluating unit 50A serves further for converting also the measurement value $X_{M2}$ of the second kind into an appropriately corresponding measurement value signal $x_{M2}$ also accessible at the output of the operating and evaluating circuit 50. While in the case of the transducer shown here, the density or also viscosity are quite determinable on the basis of a single one of the measurement signals $s_1$, $s_2$, for the case, in which the mass flow is to be measured, both measurement signals $s_1$, $s_2$ are used in manner known to those skilled in the art, in order, for example in the signal time domain or in the signal frequency domain, to ascertain a phase difference corresponding with the mass flow.

In a further embodiment of the invention, the evaluating unit 50A is implemented using the microcomputer μC provided in the measuring device electronics 20. In this case, the microcomputer is so programmed that it repetitively digitally ascertains the measurement value $X_{M1}$ of the first kind and, as required, also the measurement value $X_{M2}$ of the second kind on the basis of the measurement signals delivered here by the oscillation sensors 17, 18. As additionally shown in FIG. 2, each of the measurement signals $s_1$, $s_2$ is fed by way of, in each case, an A/D converter, to the microprocessor in the form of an appropriately corresponding digital signal. Alternatively to, or in supplementation thereof, the two signals can be used to form an analog signal difference and/or sum before the digitizing, as is usual especially in the case of Coriolis mass flow transducers.

The measurement or operating data produced and/or received by the evaluating unit 50A can, as already indicated, additionally be stored volatilely and/or persistently in corresponding digital data memories RAM, EEPROM.

In the case of the measuring transducer shown here, such is an active transducer, since it is fed, during operation, by an exciter signal, controlled here with respect to exciter-current strength, for the purpose of measurement signal generation. Consequently, the measuring device electronics 20 includes, in a further development of the invention, additionally for feeding the exciter mechanism with the mentioned exciter signal $i_{exc}$, a driver unit 50B, which forms together with the operationally vibrating, measuring tube 10, in effect, an electromechanical control loop. This control loop is, at least for the case in which the transducer is a Coriolis mass/density transducer, advantageously so designed that it tunes to a mechanical resonance frequency of the desired excited vibrations of the measuring tube 10 as well as also to the amplitude of these vibrations specified by means of the reference signal Sr. Driver unit 50B can, in such case, be formed e.g. in usual manner by means of a phase-locked loop, a so-called PLL, for electrical control of resonance frequency and phase position of the driver signal and by means of a corresponding amplitude control stage for the electrical control of the amplitude of the driver signal and, as a result, also the vibration amplitude.

As shown in FIG. 2, the driver unit 50B is also in contact with the evaluating unit 50A, from which the driver unit 50B receives the required operating data, such as e.g. the instantaneously required exciter frequency and/or the amplitude and possibly phase instantaneously required for the exciter current, or to which the driver unit 50B sends internally produced adjusting signals and/or parameters, especially also information concerning the actual exciter current $i_{exc}$ and/or the exciter power $P_{exc}$ fed into the transducer. The operating data for the driver unit 50B, thus here, for example, an exciter frequency $f_{exc}$, a signal amplitude and/or a phase position of the driver signal $i_{exc}$ relative to the measurement signal $s_1$, can be, in such case, both absolute as well as also relative specifications. Alternatively to, or in supplementation thereof, the operating data sent to the driver unit 50B can also represent incremental, or decremental, changes of exciter frequency, amplitude and/or phase. In addition to the microprocessor μC, the operating and evaluating circuit 50 can further include, for example, a signal generator serving for producing the driver signal, for example a digital signal processor or a programmable logic component appropriately configured as a signal generator.

Besides the at least one measuring device 1, the measuring arrangement additionally includes, as schematically indicated in FIG. 1, superordinated to the measuring device 1, an electronic data processing system 2, to which, at least in normal measurement operation, the measuring device repeatedly transfers ascertained measurement values, possibly also in form of a digitally coded telegram, as near in time as possible and/or in real time. For capturing measurement values transmitted from the measuring device, data processing system 2 further includes at least one evaluating circuit 80 communicating suitably, at least at times, with the field device. The superordinated data processing system 1 can be, for example, part of a process-near, automated control, or also a remote process control system, which has a plurality of process control computers and/or digital programmable logic controllers, which are arranged spatially distributed in an industrial plant and coupled together via a corresponding data transmission network, especially one formed also by means of digital fieldbusses. Equally, the data processing system can be connected with further measuring devices and/or with control devices acting on the process, i.e. devices such as valves or pumps. In a further development of the invention, the data processing system further includes at least one fieldbus FB, especially a serial fieldbus, serving for the transmission of digital measurement and/or operating data. The at least one fieldbus FB can be, for example, one based on one of the standards established in industrial process automation, such as e.g. FOUNDATION FIELDBUS, PROFIBUS, CAN-BUS, MODBUS, RACKBUS-RS 485, or the like. In an advantageous further development, it is, in such case, further provided that the aforementioned evaluation circuit 80 is coupled to the at least one fieldbus, especially for the forwarding of the measurement values received from the field device in the form of digital measurement data. Depending on embodiment of fieldbus and measuring device, the latter can be connected to the data processing system either directly or by means of an adapter, which suitably converts the signal carrying the measurement value.

The field device 1 and the data processing system 2, which may be spatially considerably removed from the field device 1, are, in a further development of the invention, electrically connected together by means of at least one line pair 2L, through which, during operation, at least at times, electrical current I, especially variable electrical current, flows. The current can be feed in, for example, from an external electrical energy supply 70 provided in the superordinated data processing system and providing, during operation, at least one supply voltage $U_V$, especially a unipolar supply voltage, driving current I flowing in the line pair 2L. Serving as energy source can be, in such case, e.g. a battery and/or a direct or alternating voltage source fed via a plant-internal supply grid. For the, especially releasable, connecting of the at least one line pair 2L to the measuring device 20 and, as a result, to the field device 1 as such, provided in the line pair is additionally at least one terminal pair directed externally. The measuring arrangement is additionally so constructed in a further embodiment that the measuring device transmits the internally generated measurement values, be they now measurement values of a single, registered measured variable or measurement values of diverse registered measured variables, such as e.g. a mass flow and a density of a medium flowing in a pipeline, at least partly via the at least one line pair 2L, to the superordinated data processing system 2. The pair of electrical lines 2L can, in such case, be formed, for example, as part of a so-called two-conductor current loop well proven in the technology of industrial measurements. For this case, then, on the one hand, the measurement values produced at least at times are transmitted via this single line pair 2L to the superordinated data processing system in the form of load modulated, especially clocked or continuously variable, loop current and, on the other hand, the measuring device electronics and, as a result, the measuring device, is supplied with electrical energy, at least at times and/or at least in part, via the line pair 2L.

The measuring device electronics 20 is, in a further embodiment of the invention, additionally designed for generating, during operation, a plurality of measurement values, especially digital measurement values, representing, at least in part, the at least one measured variable, and for transmitting these at least partially via terminals and line pair 2L appropriately connected thereto to the connected data processing system 2 in a form which can be used by the data processing system 2. In case required, the measuring arrangement of the invention can, to further promote its purpose, be further developed such that measuring device 1 and data processing system 2 are connected together also by means of at least one additional, second line pair (not shown), through which, during operation, a current correspondingly flows, at least at times. For this case, the measuring device can additionally transmit the internally generated, measurement values, at least in part, also via the additional line pair to the data processing system. Alternatively to, or in supplementation thereof, measuring device and data processing system can also communicate wirelessly with one another, for example by means of radio waves. Especially for this last case, it can also be of advantage to supply the field device with electrical energy, especially even exclusively, by means of an internal and/or external battery, especially an exchangeable and/or rechargeable one, and/or with a fuel cell. Moreover, the field device can additionally also, or exclusively, be supplied by means of power converters placed directly on the field device and/or remotely therefrom, using regenerative energy sources, examples being thermogenerators, solar cells, wind generators, or the like.

In a further embodiment of the invention, it is provided that the measuring device can exchange with an external service and control unit, for example a handheld service device or a programming device provided in the superordinated data processing system, at least at times, device specific data, such as e.g. measuring device internal setting parameters for the measuring device electronics and/or measuring device internal diagnosis parameters. To this end, provided additionally in the measuring device electronics 20 is at least one communications circuit COM, which controls communications via at least one of the line pairs, here the first line pair 2L. Especially, the communications circuit serves for converting the device data to be sent into signals transmittable over the appropriate pair of electrical lines and then the communications circuit COM couples such signals into such pair. Alternatively to, or in supplementation thereof, the communication circuit COM can, however, also be designed for appropriately receiving device-specific data sent over the pertinent pair of electrical lines, for example a set of setting parameters for the measuring device electronics which are to be changed. Serving as communications circuit COM can be e.g. an interface circuit working according to the HART® Field Communications Protocol (HART Communication Foundation, Austin, Tex.), which uses high frequency, FSK-coded (frequency shift keying), alternating voltages as signal carrier, or, however, also an interface circuit designed on the basis of the PROFIBUS standard. In case required, processes running externally, for example in a runtime environment of the superordinated data processing system, communicating with the measuring device electronics 20 and processing data can have direct access to the measuring device electronics, especially also in data writing and/or data reading manner, to the data memory circuit 15 provided in the measuring device electronics.

To form a process measuring point, the measuring field device is first placed appropriately on-site, especially securely mounted, and caused to start operating. To this end, the field device is first installed by way of placement of the transducer on, at and/or in the process vessel, for example, by means of an appropriate flange and/or mounting nozzle. The process vessel is, for example, a pipeline, a gutter, a tank, a basin or the like, serving for conveying and/or holding the medium to be measured. In a further development, the field device is connected additionally to the superordinated, electronic, data processing system, in order to form the finished process measuring point; this connection is done in such a manner that data are, at least in normal operation, communicable recurrently, especially by wire and/or wirelessly by radio. In such case, the communications connection between the field device and the data processing system can already be put in place immediately before or after the mounting of the transducer. As already mentioned, the communications connection can, in such case, be formed, at least sectionally, by means of a digital data line, especially a two-wire line also providing energy, or power, to the field device, and/or at least sectionally by means of a radio connection.

As a result of the application of a programmable microcomputer µC with associated memory periphery formed by means of suitable semiconductor memory, especially non-volatile memory, for data and/or programs, the field device can, as also proposed in, among others, the above-mentioned U.S. Pat. No. 7,124,239 or U.S. Pat. No. 6,854,055, be reconfigured, also following installation, on-site, especially during or also after its start-up, by reprogramming of individual software components and/or also by exchange of complete software packages.

According to the invention, it is provided that, once the field device has been installed on-site at the process vessel conveying or holding the medium during operation, and, for instance, physically connected by means of electrical lines to the superordinated data processing system, be it for the purpose of data exchange and/or for the purpose of energy supply, then, first of all, the microcomputer is booted, in order then to activate a basic software, especially an at least partly hardware-near, basic software, so that the basic software BS, for example provided as firmware, can be executed by means of the microcomputer µC. The basic software BS is, for such purpose, stored in a first memory, especially a non-volatile first memory, provided within the memory circuit and, as a result, also within the field device, and provides basic functionalities of the field device, which, following booting, are then available through interaction of basic software and hardware installed in the field device. For activating, respectively executing, the basic software, at least parts thereof currently actually needed are loaded into the volatile working memory.

Basic functionalities can be e.g. control programs for producing driver signals, which are, at least within a transducer series belonging to the particular measuring transducer, universally applicable and largely unified, and which enable at least the start-up also of the transducer and thus also the production at least of preliminary measurement signals. Furthermore, the basic functionalities can be robust, and thus universal, setting parameters for the input stage preprocessing the measurement signal, for example, also reducing the filter order to the detriment of filter sharpness and/or filter-dynamics to a minimum level, as well as correspondingly universal, signal processing programs for the at least one digital signal generated by means of the input stage and for ascertainment, as required, of also still inexact, preliminary measurement values. Alternatively to, or in supplementation thereof, the basic functionalities of the field device include, in a further embodiment of the invention, calculating routines for spectral analysis at least of the at least one measurement signal. The spectral analysis can, in such case, be done based on discrete Fourier transformation of the digitized measurement signal and/or based on a discrete autocorrelation of the same. Further, basic functionalities can also include diagnosis functions, which, especially based on the at least one measurement signal, recurrently check for a functional capability of the field device. Finally, the basic functionalities provided by the basic software BS can also include hardware-near software components, so-called bootstrap loaders, enabling the booting of the microcomputer µC itself and/or such software components, by means of which the communication connection can be established, or used, with the superordinated data processing system. In such case, it is especially provided that the communication connection finally implemented by means of the basic software is so embodied, that measurement values possibly equally produced by means of the activated basic software are not forwarded as valid measurement values to the data processing system, for example are thus not even output, or are output only when designated as currently invalid.

Alternatively to, or in supplementation of, an implementation as loadable, on occasion also editable, program code for the microprocessor, a part of the basic functionalities of the field device can, if required, also be implemented by means of fixedly programmed, program memories and/or by means of correspondingly fixedly wired, digital circuit components, e.g. in the form of application-specific, integrated ASIC circuits, permanently available in the measuring device electronics 20. Accordingly, in a further embodiment of the invention, the first memory holding the basic software is formed at least partially as part of non-volatile, thus permanent and/or persistent, memory elements.

According to the invention, it is further provided that, following booting of the microcomputer (possibly also following a first checking of the ability of the measuring device to function correctly), with application of basic software then executed therein, at least one initial-identification-parameter-set IIPS, at least temporarily present and identifying the process measuring point at least approximately, is transferred to the superordinated electronic data processing system formed externally of the field device.

The identification parameter set IIPS is, especially so formed and dimensioned, that therewith, at least partially, an instantaneous installation situation of the field device and/or a medium located in, at or on the process vessel is appropriately represented, at least to the extent that the ultimately desired measurement accuracy of the field device is influenced thereby. Of importance for the measuring accuracy of the installed field device are, in such case, among other factors, its installed position and its closeness to a disturber, such as, perhaps, a valve, a pump, a stirrer or the like, thus parameters more closely identifying the installation situation, especially also parameters which are dimensionally specific. Other parameters more closely specifying the installation situation are, for example, for measuring devices of the type being discussed, the particular nominal diameter, wall thickness and/or material properties of the containers or pipelines already present in the area of the process measuring point, or also the exact dimensions and orientations of prefabricated installation openings or connection nozzles possibly used for installation of the measuring device. Moreover, for a large number of field devices, especially those used in pipelines, also of special interest as parameters more closely identifying the medium and, in such respect, the application, especially dimensionally specifying parameters, can be, among other things, also the flow type for the medium present in the process vessel, especially as regards turbulence, stability of the flow profile, phase distributions and/or the composition of the medium, especially as regards concentrations of possibly entrained, foreign materials.

The identification parameter set IIPS can be formed both by a single, complex parameter, which has been determined on-site by means of the microcomputer μC, e.g. based on a differential diagnosis performed on the basis of actually measured and/or queried, individual parameters, and/or also by means of a plurality of individual parameters, which ultimately specify the process measuring point in a composite picture, or differential diagnosis, as the case may be, created, respectively performed, first in the superordinated data processing system, especially also with measurement values and/or operating data delivered by other field devices or also with other user data held in the data processing system. In such case, for determining the identification parameter set IIPS by means of the measuring device and/or within the superordinated data processing system, implemented binary-logic and/or fuzzy-logic based, rule systems, neural networks or also classifiers based on multivariant statistics, for example a covariance analysis, can be used for measurement values and/or operating data. Examples of such, in part, also very complex diagnosis functionalities useful for identifying process measuring points are set forth in, among others, also the initially mentioned U.S. Pat. No. 7,040,181, U.S. Pat. No. 6,505,519, or U.S. Pat. No. 6,634,238.

Considering the multiplicity of possibilities for special installations of such measuring devices, as well as also the multiplicity of possible media, it can additionally be of advantage for determining the identification parameter set to provide a corresponding data base system, be it in the superordinated data processing system and/or in an external programming device used on-site for start-up of the measuring device. In such data base system, on the one hand, various installation possibilities and/or media are classified, and, on the other hand, the identification parameter sets, or the individual and/or complex parameters corresponding therewith, are appropriately matched. Additionally, it can be of advantage to suitably visualize the currently determined identification parameter set on-site, at the measuring device, for example by means of a possibly present, display element and/or by means of an external, programmable device possibly connected to the measuring device.

In a further embodiment of the invention, it is additionally provided that the initial identification parameter set IIPS is stored in the measuring device electronics at least temporarily non-volatilely, especially persistently, in a re-writable, semiconductor memory. Alternatively or in supplementation thereof, in another embodiment of the invention, it is further provided that the at least one, initial identification parameter set is determined runtime, using basic software executed in the microcomputer. Especially, the at least one, initial, identification parameter set IIPS is determined, in such case, also taking into consideration the at least one measurement signal $s_1$. Accordingly, the basic functionalities provided by interaction of hardware and basic software BS include, at least for this case, also the functions by means of which the measurement signal $s_1$ can be produced, processed and appropriately evaluated. Additionally, in a further embodiment of the invention, it is provided that at least one digital measurement value instantaneously representing the at least one measured variable is determined based on the at least one measurement signal $s_1$ and basic software executed in the microcomputer μC.

In another embodiment of the invention, it is further provided that the initial identification parameter set is generated also taking into consideration the digital measurement signal, especially also taking into consideration a discrete signal sequence at least volatilely buffered in the internal memory of the field device. Especially, the basic functionalities of the field device include therefor calculating routines for comparing discrete signal sequences with earlier determined, discrete signal sequences for various applications, especially signal sequences earlier determined for various installation situations and/or for various media, and for comparing discrete signal sequences with classified signal prototypes derived from the earlier determined signal sequences. Additionally, it is provided in a further embodiment of the invention that, for generating the at least one identification parameter set, one or more of such earlier determined signal prototypes non-volatilely stored in the measuring device electronics is/are compared with discrete signal sequences, in given circumstances also stored volatilely and/or non-volatilely, corresponding with sections of the measurement signal. Alternatively to, or in supplementation of, use of such discrete signal sequences, and signal prototypes based thereon, corresponding with sections of the measurement signal, the basic functionalities of the field device can also include, for the above-described case, calculating routines for spectral analysis of the at least one measurement signal; for example, by means of such a spectral analysis, currently won, discrete signal sequences can be used with corresponding signal prototypes for generating the at least one identification parameter set. In such case, e.g. a currently determined, discrete amplitude spectrum of a section of the at least one measurement signal $s_1$ can be compared with prototypes of discrete amplitude spectra earlier determined for given installation situations and/or given media. Additionally, also spectral amplitude values determined at a certain signal frequency serving as reference can be compared with reference values of equal frequency earlier determined and correspondingly provided therefor and/or spectral signal frequencies determined at a certain signal amplitude serving as reference can be compared with reference values of equal amplitude earlier determined and correspondingly provided therefor.

Alternatively to, or in supplementation of, determining of the initial identification parameter set IIPS by means of the at least one measurement signal $s_1$, a further embodiment of the invention provides that this is determined taking into consideration at least one application parameter specified by a user. The application parameter can be so formed, for example, that the application is sufficiently specified therewith as regards predetermined calculating routines possibly even specifically standardized, for determining the measurement values, as well as also their units, diagnosis and monitoring routines, as well as corresponding alarm issuing methods. The application parameter can be determined, for example, during start-up, by the user by means of a human-machine interface HMI on-site, as such is provided especially directly in the field device and/or from the superordinated data processing system. Moreover, the basic functionalities can, in this respect, be so developed, that the application parameter can, for example, be determined suitably also in dialog with the already booted field device.

In a further development of the invention, the mentioned communications connection between the field device and the data processing system can be established before the transferring of the at least one, initial, identification parameter set IIPS, especially also with application of basic software BS executed in the microcomputer PC, in order then to be used for transmission of the same to the superordinated data processing system.

The transferring of the at least one, initial, identification parameter set to the data processing system can occur, furthermore, by issuance of a corresponding start-command. This can, for example, be manually input on-site or also, as the occasion demands, from within the data processing system, for example from the control room. The inputting and, as a result, also the production of the start-command, can, in such case, be done by applying the already mentioned human-machine interface communicating with the field device, for example electrically connected to this externally and/or provided therein. Furthermore, manual production of the start-command can also occur with application of a selection function provided by the measuring device electronics; the selection function enables the user, in dialog with the field device, to select from a plurality of possible communication connections, possibly already activated, that connection via which the identification parameter set is to be transferred to the data processing system. Alternatively to manual initiation of the start-command, the transferring of the at least one initial identification parameter set to the data processing system can also be initiated automatically, for example by the measuring device electronics, following successful determination of the identification parameter set.

For the case in which the communications connection is used for the transferring and this already connects further field devices equally with the data processing system, then the transmission does not necessarily have to be done in near time and directly, but, instead, may be accomplished mediately. However, the communications connection can still also be so embodied, that, by means of the start-command, the transferring of the at least one initial identification parameter set to the host computer is initiated, instead, in near time, and even possibly in real time.

According to the invention, it is, furthermore, provided that, taking into consideration the at least one transferred initial identification parameter set IIPS, at least one upgrade software US stored in a second memory, especially a non-volatile memory, is selected from the ensemble of software products. The upgrade software is specially tailored for the process measuring point and provides for the field device custom functionalities going beyond the basic functionalities available beforehand in the field device installed on-site.

The custom functionalities can include, for example, functions relating to measurement signal processing and evaluation, as well as also measurement value generation and/or presentation, and, thus, in fact, functions which are branch or user specifically adapted. Alternatively to or in supplementation thereof, the adapted, custom functionalities can also relate to sensor or field device specific functions, such as, for example, driver software components for the operating and evaluating circuit, especially regarding the conditioning of the raw measurement signal and/or the production of specially adapted driver signals. Accordingly, in a further embodiment of the invention, the upgrade software US is built in such a manner that it provides at least one data set of setting parameters to be changed for the field device. The setting parameters delivered by means of the upgrade-software US can, for example, be determined for the signal input stage conditioning the at least one measurement signal $s_1$ and/or for other components of the installed hardware. Alternatively to or in supplementation thereof, the setting parameters delivered by means of the upgrade-software US can, however, also be provided for an evaluation algorithm executed by means of the microcomputer and numerically calculating the at least one measurement value and/or for a signal output stage delivering at least one driver signal for the sensor. Especially, such an evaluation algorithm can also be a calculating algorithm representing a digital, especially adaptive, filter. The setting parameters to be changed can, furthermore, have been generated, at least in part, by means of calibration measurements performed earlier on said field device and/or e.g. also on a field device of equal type. Further, the upgrade software can, additionally, provide a diagnosis function going beyond the diagnosis function in the basic functionalities determining the at least one, initial, identification parameter set.

In a further embodiment of the invention, the upgrade software US is embodied as hardware-near software, so-called firmware. Accordingly, the software products can be, for example, fixedly programmed on the manufacturer side and then fixed in a non-changeable manner, or changeable only with special authorization. Alternatively or in supplementation, the software products can be programmed on the manufacturer side but designed to be, at least in part, user-specifically adjustable, for example on the user side and/or within the runtime environment of the data processing system.

Considering that the identification parameter set IIPS more closely specifying the process measuring point lastly also uniquely identifies the particularly required upgrade software, the identification parameter set can also be established directly in the form of a corresponding order code for the upgrade software US.

The second memory holding, especially persistently, the upgrade software for selection can be docked e.g. externally of the field device, e.g. in the form of a USB stick externally applied to the measuring device electronics 20. It can, however, also be arranged remotely from the field device, especially internally in the data processing system in a host computer provided therein or also in a data net work installed manufacturer side and accessible from the outside, for example a data network organized as an intranet. The aforementioned host computer can be placed, for example, in a control room or even in a remote computer center of the user. As already indicated, the second memory holding the upgrade software US can be, for example, an electrically rewritable, semiconductor memory, especially one connectable to the measuring device electronics 20 externally via a USB interface or via another suitable service interface. Alternatively to or in supplementation thereof, the second memory can, however, also be formed by means of a hard disk, a CD-ROM, a diskette, a DVD, a magnetic tape or some other mass storage device as well as reading devices communicating with the measuring device for the particular mass storage devices.

The upgrade software US selected based on the at least one identification parameter IIPS and correspondingly adapted to the process measuring point, especially to the installation situation of the field device and/or to the medium in the process vessel, is then transferred into a third memory, e.g. a non-volatile memory, provided therefor within the field device. In case required, the upgrade software US can, however, also be held, especially exclusively, volatilely in the measuring device electronics. Accordingly, the third memory can thus be formed by means of components of the non-volatile, data storage circuit 15 and/or by means of components of the volatile, data storage circuit 16. Additionally, for transferring the upgrade software to the field device, transmission methods known to those skilled in the art can be used, for example according to the configuring and reconfiguring methods for field devices disclosed in the initially mentioned U.S. Pat. No. 6,854,055, US-A 2004/0015952, WO-A 01/14968, WO-A 00/77585, WO-A 00/77583 or WO-A 00/48157 or also in U.S. Pat. No. 5,467,286, U.S. Pat. No. 5,812,857, U.S. Pat. No. 5,937,198, U.S. Pat. No. 6,055,632 or U.S. Pat. No. 6,055,633.

For the case, in which, on the one hand, the upgrade software US is to be transferred via the data processing system to the field device and, on the other hand, the communications connection between field device and superordinated data processing system is already established, a further embodiment of the invention additionally provides that the upgrade software US is transmitted, especially acyclically, via the communications connection to the field device. In such case, the upgrade software US can be transmitted, for example, in the course of a downloading controlled from the measuring device or, however, also in the course of an uploading to the measuring device controlled from the data processing system.

After the upgrade software US, especially software which is at least partially hardware near, has been transferred into the third memory and, in certain circumstances, has been appropriately released by the user and/or manufacturer, the upgrade software US then available, persistently and/or permanently or, possibly, volatilely stored in the field device is activated in such a manner that at least the transferred upgrade software is executable by means of the microcomputer. As a result of this, on the basis of interaction of upgrade software and hardware installed in the field device, then, exclusively or supplementally, custom functionalities of the field device are available on-site. In degree equal to the situation before as regarded activation of the basic software, also in this case the activation of the upgrade software means that at least the components of the upgrade software required for implementing currently actually needed custom functionalities are loaded into the volatile, working memory. The activating of the upgrade software can, in such case, be performed, for example, in the form of a warm start, thus without intermediate turning-off of the microcomputer $\mu C$, or, however, also in the course of a cold start, thus by switching off and then switching back on the entire measuring device.

After the upgrade software has been activated, it is provided, in a further embodiment of the invention, that least one digital measurement value representing instantaneously the at least one measured variable is generated, based on the at least one measurement signal and the upgrade software now executed in the microcomputer $\mu C$. The at least one digital measurement value generated by means of the upgrade software US and the at least one measurement signal $s_1$ is preferably so formed that it is of equal type to digital measurement values $X_{M1}$, $X_{M2}$ earlier generated, such that it represents the same measured variable, especially also in an equal unit of measurement.

As already mentioned, the custom functionalities provided by means of the upgrade software US can also include expanded diagnosis functions. These can advantageously be formed in such a manner that, in further operation of the measuring device, the initial identification parameter set IIPS is validated therewith and/or the process measuring point is repetitively checked for changes significant for the actual measurement. Furthermore, it is provided, in such case, that, following activating of the upgrade software, at least one refined identification parameter set is established, which, by applying upgrade software and/or basic software executed in the microcomputer, represents instantaneously the process measuring point formed by the cooperation of field device and process vessel, especially, again, also the instantaneous installment situation of the field device and/or the medium present in the process vessel. This, especially, with the goal of specifying the process measuring point still more accurately than was the case with the initial identification parameter set. The refined identification parameter set can then, in turn, be transferred to the superordinated data processing system with utilization of upgrade software and/or basic software executed in the microcomputer. Finally, the refined identification parameter set can be established according to the same schema as the initial identification parameter set and/or it can be transferred to the superordinated data processing system. Accordingly, the refined identification parameter set can also be established under application of the at least one measurement signal. Additionally, it is, however, also possible for establishing the refined identification parameter set also to take into consideration the earlier generated, initial identification parameter set. Furthermore, also the transferring of the refined identification parameter set can, on the one hand, be started manually on the part of the user via a human-machine interface or also, automatically, by the measuring device and, on the other hand, such can also be carried out via one of the aforementioned communication paths.

By means of the refined identification parameter set, in the end, present within the data processing system, therefore, again, as required, from that multiplicity of software produces stored in the data processing system, a more suitable, for example also hardware-near, upgrade software can be selected and transferred to the measuring device, for providing for the field device custom functionalities supplementing or replacing custom functionalities currently available in the field device by going beyond the basic functionalities of the field device. The transferring and storing of this more-suitable upgrade software can be done, for example, by uploading into the measuring device operating in normal measurement operation or, however, also by placing the measuring device into a configuration mode with deactivated measuring function at least for the storing as well as for the subsequent activating of the new upgrade software. The third memory provided in the field device and currently holding the preceding upgrade software and/or a fourth memory additionally provided in the field device, especially a non-volatile, fourth memory, can serve for storage of the transferred, new, upgrade software.

Additionally, by comparing the at least one, possibly also repetitively established, refined identification parameter set with a predetermined device parameter representing the hardware of the field device and/or the software executable in the field device at the moment, it is possible to verify, to what extent the current upgrade software still satisfies the current conditions at the process measuring point, which may have changed over the course of the operating time of the measuring device and whether, for example, there is now an acute risk of increased measurement inaccuracy. Accordingly, in a further embodiment of the invention, it is additionally provided, for the purpose of verifying the ability of the installed field device to fulfill the assigned measuring task, that, at least at times, a report is generated by means of the measuring device electronics for signalling whether the identification parameter set and a device parameter agree and/or that, at least at times, a report is generated for signalling whether the identification parameter set and a device parameter deviate from one another. The device parameter can be, for example, a device identifying number stored in the measuring device or a stored version number of the current upgrade software.

In an advantageous further development of the invention, it is additionally provided that the at least one identification parameter set IIPS produced by means of the field device and transferred to the electronic data processing system is stored there non-volatilely. Based on the identification parameter set IIPS stored in the data processing system, then that report, according to which the at least one further upgrade software has been included in the ensemble software products, can be transmitted near in time and selectively exactly when the included upgrade software actually or at least very probably fits the process measuring point identified by the stored identification parameter set IIPS. Accordingly, in a further embodiment of the invention, it is additionally provided that, after at least one further upgrade software has been added to the ensemble of software products, the at least one identification parameter set stored in the data processing system is used for generating a report, especially a report addressed directly to the field device; this report correspondingly signals that the at least one additional upgrade software has been added to the ensemble. The report can be displayed, for example, on-site and/or it can be further processed in such a manner that the new upgrade software is ordered and, equally as before, the upgrade software currently activated in the field device is transferred to the measuring device electronics. A further advantage of such a storing of identification parameters determined during the course of operation of the measuring device timewise following one after the other is additionally to be seen in the fact that therefrom, possible, significant change of the regime, with which the process is operating in the region of the process measuring point, and/or a significant change of the properties of the medium being measured, can be recognized and, in case required, cared for with appropriate software updates and/or reports.

The invention claimed is:

1. A method for start-up and/or reconfiguration of a programmable, measuring field-device, whose installed hardware includes at least one measuring transducer reacting during operation to a chemical and/or physical, measured variable of a pourable and/or flowable medium and a microcomputer communicating with said measuring transducer during operation, said method comprising:
installing the field device by means of the measuring transducer at a process vessel for conveying and/or holding pourable and/or flowable media for providing a process measuring point;
booting the microcomputer and activating basic software held in a first memory provided within the field device and at least partially providing basic functionalities of the field device, in such a manner, that the basic software is executable by means of the microcomputer, so that the basic functionalities of the field device are available on the basis of interaction of basic software and hardware installed in the field device;
executing the basic software in the microcomputer for determining at least one initial identification parameter set, said initial identification parameter set at least approximately identifying the process measuring point including an instantaneous installation situation of the field device and/or a medium located in the process vessel;
and said initial identification parameter set being held at least temporarily in the field device;
transferring said initial identification parameter set to a superordinated, electronic data processing system external to the field device;
selecting from an ensemble of software products, taking into consideration said initial identification parameter set at least one upgrade software providing custom functionalities for the field device going beyond the basic functionalities, said upgrade software being held in a second memory located externally of the field device;
transferring selected upgrade software, matched to the process measuring point, into a third memory provided within the field device; and
activating upgrade software in such a manner that at least the transferred upgrade software is executable by means of the microcomputer, so that, with interaction of the upgrade software and hardware installed in the field device, custom functionalities of the field device are available.

2. The method as claimed in claim 1, wherein:
the second memory, especially a non-volatile second memory, holding the upgrade software is arranged externally of the field measuring device, especially remotely therefrom and/or internally of the data processing system.

3. The method as claimed in claim 1, further comprising:
connecting the field device to the superordinated electronic data processing system in such a manner that data are communicable between field device and the electronics data processing system, especially by wire and/or wirelessly by radio.

4. The method as claimed in claim 1, further comprising:
establishing a communications connection between the field device and the electronic data processing system for transmission of said initial identification parameter set and/or for transmission of said upgrade software.

5. The method as claimed in claim 4, wherein:
the communications connection is formed, at least sectionally, by means of a digital data line, especially one embodied as a two-wire line also feeding the field device electrical energy or power, and/or, at least sectionally, by means of a radio connection.

6. The method as claimed in claim 1, wherein:
the second memory holding the upgrade software is provided in a host computer provided in the electronic data processing system, especially a host computer located in a control room.

7. The method as claimed in claim 1, wherein:
the second memory holding the upgrade software is formed by means of a hard disk, a CD-ROM, a diskette, a DVD, a magnetic tape or another form of mass storage.

8. The method as claimed in claim 1, wherein:
the microcomputer is formed by means of at least one microprocessor and/or by means of a signal processor.

9. The method as claimed in claim 1, wherein:
the microcomputer has at least one volatile memory, especially a memory serving as working memory for a microprocessor and/or a signal processor provided in the microcomputer.

10. The method as claimed in claim 1, wherein:
the first memory for basic software provided in the field device is formed as a non-volatile, especially persistent, memory.

11. The method as claimed in claim 1, wherein:
the third memory for custom software provided in the field device is embodied as volatile memory.

12. The method as claimed in claim 11, wherein:
the step of activating the basic software includes a step of loading at least parts of the basic software into the volatile working memory and/or wherein said step of activating the upgrade software includes a step of loading at least parts of the upgrade software into the volatile working memory.

13. The method as claimed in claim 1, further comprising: inputting a start command, which initiates said transferring of said initial identification parameter set to the data processing system.

14. The method as claimed in claim 1, further comprising: producing at least one measurement signal by means of the measuring transducer.

15. The method as claimed in claim 1, wherein: determining the initial identification parameter set including taking into consideration application parameters input by a user in dialog with the field device by means of a human-machine interface, especially a human-machine interface provided directly in the field device.

16. The method as claimed in claim 15, wherein: the initial identification parameter set is determined in such a manner that it represents instantaneously, at least in part: an installation situation of the field device, especially its installed position, its proximity to a disturber, such as a valve, a pump, a stirrer or the like; and/or a medium present in the process vessel, especially its type of flow, its composition or the like.

17. The method as claimed in claim 1, wherein: the upgrade software delivers at least one data set of setting parameters to be changed in the field device.

18. The method as claimed in claim 17, wherein: the setting parameters to be changed have been generated at least in part by means of calibration measurements performed earlier on said field device and/or on a field device of equal type.

19. The method as claimed in claim 1, further comprising: determining, with application of upgrade software and/or basic software executed in the microcomputer, at least one refined identification parameter set, which represents instantaneously, especially more accurately than the initial identification parameter set, the process measuring point formed by interaction of the field device and process vessel, especially also an instantaneous installation situation of the field device and/or a medium present in the process vessel.

20. The method as claimed in claim 19, further comprising: transferring, with application of upgrade software and/or basic software, the refined identification parameter set to the superordinated data processing system.

21. The method as claimed in claim 20, further comprising: selecting from a plurality of software products stored in the data processing system, with application of the transferred, refined identification parameter set, at least one upgrade software, which goes beyond the basic functionalities of the field device and provides custom functionalities for the field device supplementing or replacing custom functionalities currently available in the field device.

22. The method as claimed in claim 21, further comprising: transferring the selected, especially hardware near, upgrade software into the third memory provided within the field device and/or into a fourth memory, especially a non-volatile memory, provided within the field device.

23. The method as claimed in claim 19, wherein: the refined identification parameter set is determined also with application of the measurement signal and/or the initial parameter set.

24. The method as claimed in claim 19, further comprising: applying the measurement signal for producing a start command, which initiates the determining of the refined identification parameter set.

25. The method as claimed in claim 24, further comprising: applying the measurement signal for producing a start command, which initiates, at least mediately the step of transferring of the refined identification parameter set to the data processing system.

26. The method as claimed in claim 19, further comprising: producing a start command, which initiates, at least mediately the determining of the refined identification parameter set.

27. The method as claimed in claim 26, further comprising: applying, especially in dialog with the field device, a human-machine interface communicating with the field device, especially a human-machine interface connected electrically thereto and/or provided therein, for producing the start command.

28. The method as claimed in claim 20, further comprising: producing a start command, which initiates, at least mediately the transferring of the at least one initial identification parameter to the host computer.

29. The method as claimed in claim 28, further comprising: applying, especially in dialog with the field device, a human-machine interface communicating with the field device, especially a human-machine interface connected electrically thereto and/or provided therein, for producing the start command.

30. The method as claimed in claim 29, further comprising: producing at least one discrete signal sequence corresponding with sections of the measurement signal, especially a signal sequence held in an internal memory of the field device.

31. The method as claimed in claim 30, wherein: the producing of the identification parameter set further comprises steps of applying the discrete signal sequence.

32. The method as claimed in claim 31, wherein: the basic functionalities of the field device include calculating routines for comparing discrete signal sequences corresponding with sections of the measurement signal with earlier determined and classified, signal prototypes for different applications, especially for different installation situations and/or for different media.

33. The method as claimed in claim 32, wherein: the step of producing the identification parameter set further includes steps of comparing discrete signal sequences with one or more signal prototypes.

34. The method as claimed in claim 14, wherein: the basic functionalities of the field device include calculating routines for spectral analysis at least of the measurement signal, especially based on a discrete Fourier transformation of the measurement signal and/or a discrete autocorrelation of the measurement signal.

35. The method as claimed in claim 19, wherein: the basic functionalities of the field device include calculating routines for spectral analysis at least of the measurement signal, and wherein the step of producing the identification parameter set includes steps of determining a discrete amplitude spectrum.

36. The method as claimed in claim 35, wherein: the step of producing the identification parameter set further includes a step of applying at least one spectral amplitude value of the measurement signal, especially one selected at a predetermined signal frequency and/or at a predetermined signal amplitude.

37. The method as claimed in claim 1, wherein: the upgrade software provides setting parameters for installed hardware and/or calculating algorithms representing digital filters, especially adaptive digital filters.

38. The method as claimed in claim 1, wherein: the upgrade software provides an expanded diagnosis function.

39. The method as claimed in claim 19, further comprising: determining at least one digital measurement value, which represents instantaneously the measured variable, based on the measurement signal and upgrade software executed in the microcomputer. 40. The method as claimed in claim 19, further comprising:
determining at least one digital, measurement value, which represents instantaneously a measured variable, based on the measurement signal and basic software executed in the microcomputer.

41. The method as claimed in claim 29, further comprising:
determining at least a first digital measurement value representing instantaneously the measured variable based on the measurement signal and basic software executed in the microcomputer; and
determining at least a second digital measurement value representing instantaneously the measured variable based on the measurement signal and upgrade software executed in the microcomputer.

42. The method as claimed in claim 41, wherein:
the first digital measurement value and the second digital measurement value are of equal type in so far as they represent the same measured variable, especially with an equal unit of measurement.

43. The method as claimed in claim 39, further comprising:
establishing a communications connection between the field device and the superordinated electronic data processing system for transmitting the digital measurement value.

44. The method as claimed in claim 43, wherein:
the communications connection is formed at least sectionally by means of a digital data line, especially a data line in the form of a two-wire line also providing energy, or power, to the field device, and/or at least sectionally by means of a radio connection.

45. The method as claimed in claim 43, further comprising:
transferring the measurement value to the electronic data processing system.

46. The method as claimed in claim 1, further comprising:
storing within the superordinated electronic data processing system at least one identification parameter set produced by means of the field device and identifying at least approximately the process measuring point.

47. The method as claimed in claim 46, further comprising:
adding at least one further upgrade software to the ensemble of software products and applying the identification parameter set stored in the data processing system for generating a report signaling the addition of the at least one further upgrade software to the ensemble.

48. The method as claimed in claim 47, wherein:
said generating the report is performed, when the added upgrade software fits the process measuring point.

49. The method as claimed in claim 1, wherein:
the field device includes a measuring transducer housing, in which the transducer is at least partially accommodated, as well as an electronics housing, in which at least the microcomputer is accommodated.

50. The method as claimed in claim 49, wherein:
the transducer housing and electronics housing are connected together, especially essentially rigidly connected together.

51. The method as claimed in claim 19, further comprising:
comparing the refined identification parameter set with a predetermined device parameter representing the hardware of the field device and/or the software momentarily executable in the field device.

52. The method as claimed in claim 51, further comprising:
generating a report signaling whether the identification parameter set and the device parameter agree.

53. The method as claimed in claim 51, further comprising:
generating a report signaling whether the identification parameter set and the device parameter deviate from one another.

54. A method for start-up and/or reconfiguration of a programmable, measuring field-device, whose installed hardware includes at least one measuring transducer reacting during operation to a chemical and/or physical, measured variable of a pourable and/or flowable medium and a microcomputer communicating with said measuring transducer during operation, said method comprising:
installing the field device by means of the measuring transducer at a process vessel for conveying and/or holding pourable and/or flowable media for providing a process measuring point;
booting the microcomputer and activating basic software held in a first memory provided within the field device and at least partially providing basic functionalities of the field device, in such a manner, that the basic software is executable by means of the microcomputer, so that the basic functionalities of the field device are available on the basis of interaction of basic software and hardware installed in the field device;
producing at least one measurement signal by means of the measuring transducer and digitizing said measurement signal for producing a digital measurement signal corresponding with the at least one measurement signal;
applying said digital measurement signal for producing at least one initial identification parameter set, said initial identification parameter set at least approximately identifying the process measuring point, and said initial identification parameter set being held at least temporarily in the field device;
transferring to a superordinated, electronic data processing system external to the field device said initial identification parameter set;
selecting from an ensemble of software products, taking into consideration said initial identification parameter set at least one upgrade software providing custom functionalities for the field device going beyond the basic functionalities, said upgrade software being held in a second memory located externally of the field device;
transferring selected upgrade software, matched to the process measuring point, into a third memory provided within the field device; and
activating upgrade software in such a manner that at least the transferred upgrade software is executable by means of the microcomputer, so that, with interaction of the upgrade software and hardware installed in the field device, custom functionalities of the field device are available.

* * * * *